Oct. 15, 1940.  E. W. MILLER  2,217,666
RIGHT AND LEFT HAND HELICAL GUIDE FOR MACHINE SPINDLES
Filed Oct. 2, 1939  2 Sheets-Sheet 1
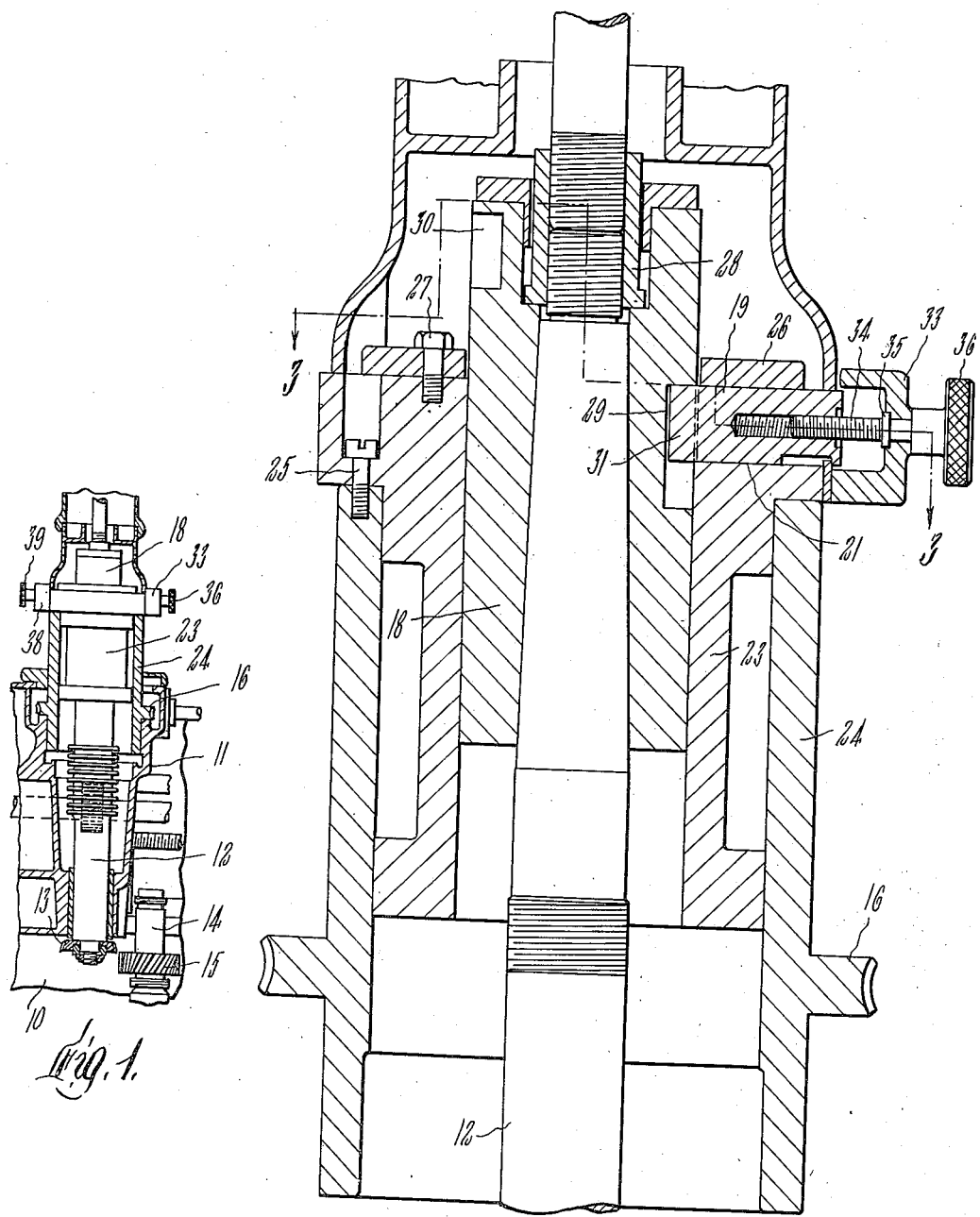

Oct. 15, 1940.  E. W. MILLER  2,217,666
RIGHT AND LEFT HAND HELICAL GUIDE FOR MACHINE SPINDLES
Filed Oct. 2, 1939  2 Sheets-Sheet 2

Inventor
Edward W. Miller
by Wright, Brown, Quinby & Mary
Attys

Patented Oct. 15, 1940

2,217,666

UNITED STATES PATENT OFFICE 2,217,666

RIGHT AND LEFT HAND HELICAL GUIDE FOR MACHINE SPINDLES

Edward W. Miller, Springfield, Vt., assignor to The Fellows Gear Shaper Company, Springfield, Vt., a corporation of Vermont Application October 2, 1939, Serial No. 297,531

5 Claims. (Cl. 74—22)

The object of the present invention is to provide interchangeable guiding means in connection with reciprocative spindles of machine tools for imparting either a right hand or a left hand twisting movement to the spindle in the course of its advancing travel. The machine tool spindles referred to are such as may be employed to carry and operate a slotting or grooving tool, with respect to a work piece, or vice versa. Occasions exist where it is desirable to cut both right hand and left hand helical grooves in the same work piece by the same machine, and also to enable one machine to cut grooves of either right hand or left hand inclination, in the same or different work pieces, with a minimum of difficulty. One phase of my object has been to provide means of the utmost simplicity, but at the same time highly accurate and rugged, for imparting rotation simultaneously with reciprocative movement to the spindle and for reversing the direction of rotation relatively to the direction of linear movement. One embodiment of means by which this object has been accomplished is shown in the drawings furnished herewith and described in the following specification, but without intent to limit the invention to any particular type of machine tool or cutting operaion or article to be produced. These drawings are to be considered as illustrating the principles of the invention by reference to a concrete embodiment.

In the drawings—

Fig. 1 is a fragmentary sectional view showing the cutter spindle of a gear shaping machine to which the herein illustrated embodiment of the invention has been adapted and applied;

Fig. 2 is a detail sectional view on a larger scale of the guiding means and adjacent parts; the section being taken on planes radial to the spindle represented by the broken line 2—2 of Fig. 3;

Like reference characters designate the same parts wherever they occur in all the figures.

Figure 3:
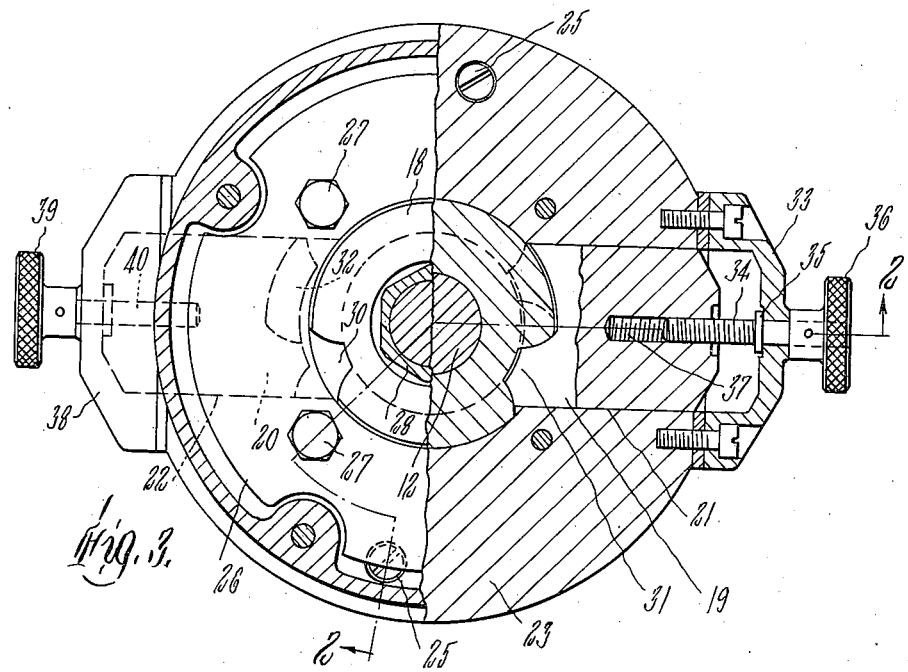
Fig. 3 is a cross section taken on line 3—3 of Fig. 2.
Figure 4:
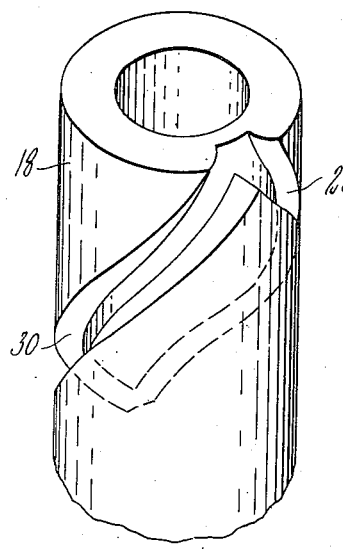
Fig. 4 is a perspective view of a sleeve constituting one of the elements of the guiding means, adapted to be mounted on the spindle to be guided.
Figure 5:
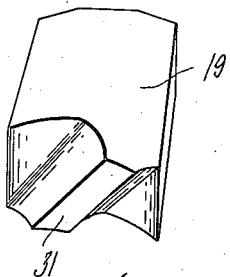
Fig. 5 is a perspective view of one of the complemental guide elements by cooperation of which with the sleeve the direction of rotation is determined.

One of the situations in which this invention finds utility is in connection with gear shaping machines for turning the cutter spindle, in the course of its endwise movement, to cut helical gears of either right or left hand, or herringbone gears; and I have chosen a machine of that type as the environment in which the new features of the invention are disclosed for the purpose of the present description. Referring to Fig. 1, 10 represents a fragment of the framework of such a machine on which is mounted a cutter saddle 11 carrying a spindle 12 on the lower end of which a gear shaper cutter 13 is mounted. 14 represents a work spindle on which the work piece 15, such as a blank to be made into a helical gear, or a rough cut helical gear to be finished, is mounted. The cutter spindle is reciprocated by means well known to all skilled in the art, and is rotated by a worm gear 16 (commonly called an index gear), by means of a worm (not shown) also in a manner well understood in the art.

The new step of this invention is embodied in guiding means interposed between the worm gear 16 and the spindle for imparting rotation to the spindle in the course of its reciprocations, additional to the rotation imparted by the index gear, and for reversing the direction of such additional rotation relatively to the strokes of the spindle in one direction. Such guiding means comprises a sleeve 18 secured to the spindle and two guide elements 19 and 20, (which for convenience of description I call shoes), mounted nonrotatably with respect to the spindle.

The shoes 19 and 20 are confined in diametrically opposite guideways 21 and 22 in the upper end of a sleeve 23 which is fitted within an outer sleeve 24 integral with the gear 16. The end of the inner sleeve which contains the guideways 21 and 22 overlaps the end of the outer sleeve and is secured to the latter by screws 25. To distinguish these sleeves readily from one another, I call the sleeve 18 a guide, the sleeve 23 a bushing, and sleeve 24 the hub of the index gear. A plate 26 overlies the shoes confining them in their guideways, and is secured to the end of the bushing 23 by screws 27. The guide 18 fits a tapered portion of the shaft, on which it is clamped by a nut 28, as shown in Fig. 2.

The guide 18 has two grooves or guideways 29 and 30 in respectively opposite sides, each surrounding half the circumference of the member and one being of right hand helical formation while the other is a left hand helix. Shoe 19 has a helical rib or tooth portion 31 complemental to the groove 29 and the shoe 20 has a rib or tooth 32 complemental to the groove 30.

A yoke 33 is mounted on the side of the bushing 23 bridging across the outer end of the guideway 21 therein and of the shoe 19. A screw 34 is mounted rotatably in this yoke, being prevented from moving endwise therein by a flange 35 abutting against the inner surface of the yoke and by a knob 36 secured to its outer end and abutting on the outer side of the yoke. This screw enters a threaded hole 37 in the shoe 19 and is engaged with the threads in the hole. Hence by rotating knob 36 the shoe may be withdrawn from engagement with the groove 29 or advanced so that its rib 31 enters the groove and makes backlash-free engagement with both bounding walls of the groove.

A similar yoke 38, knob 39 and screw 40 are arranged similarly with respect to shoe 20 and serve in the same way to advance and retract that shoe into and out of the groove 30.

When either shoe is thus entered into the groove with which it cooperates, and the other is withdrawn, the reaction of the walls of the groove on the coacting shoe, as the spindle is reciprocated, causes the spindle to be turned angularly about its axis in one direction as it is advanced and in the opposite direction as it is withdrawn. The advancing rotation is clockwise or counter-clockwise according as one shoe or the other is entered into its groove. Thus by a simple manipulation of the knobs attached to two screws, the rotational movement of the spindle due to its advancing displacement may be converted from right hand to left hand rotation, and vice versa. When applied to a gear shaping machine, for instance, the same machine may be adapted for generating right or left hand helical gears, or for cutting right or left hand helical slots in clutch elements or the like, without need of removing and replacing complemental sets of guide elements.

The invention is not limited to situations where a progressive rotation is imparted to the spindle in addition to the back and forth rotation imparted by the helical guiding means. My novel guiding means may be used also in connection with stationary housing or bearing structures. Hence the construction consisting of the inner and outer sleeves 23 and 24 may be taken as typifying any housing or bearing whatever, whether stationary or movable, in which the guide element 18 or its equivalent may be moved endwise and rotatably. With respect to the oscillative rotation of the spindle, this structure is relatively stationary, wherefore I employ the term "relatively stationary" in the claims to include within the scope of my protection the specific combination here illustrated as well as equivalent combinations in which the shoes and their supports have no rotary motion.

Uses for which the invention is adapted and designed to be used include all situations where grooves, slots or helical surfaces are to be cut, including those where a groove or grooves cut in a given work piece are of the same hand as well as those in which different grooves or different parts of a groove in one and the same work piece are of opposite hands.

Variations in the construction and arrangements of the several parts are within the scope of the invention and of the protection which I claim. For instance, the different helical grooves may be of respectively different helix angles, and they may have different helix angles in different parts of their length. They may subtend more or less than half the circumference of the guide sleeve, (crossing each other if of greater angular extent than 180°); and there may be more than two grooves and two shoes suitably spaced around the axis of the spindle, certain grooves being then of the same hand but having different helix angles. Reversals are also within the contemplation of the invention. That is, the helices of the guide sleeve 18 may be projecting ribs instead of grooves, and the shoes may be made with complemental grooves or recesses instead of protruding ribs.

Guiding means of the character described may be applied to either the cutter spindle or the work spindle of a machine tool, whichever one is reciprocated. The construction of the machine permits removal of the complemental guiding elements and substitution of others embodying the same principles but having specifically different characteristics.

What I claim and desire to secure by Letters Patent is:

1. In a machine having a spindle mounted for endwise reciprocation and for rotation about its axis, complemental guiding means comprising a plurality of helical elements carried by the spindle in respectively different angular relationships to the spindle axis and relatively stationary cooperating means mounted on the adjacent structure of the machine with capacity for selective engagement with either of said helical elements.

2. In a machine having a spindle mounted for endwise reciprocation and for rotation about its axis, complemental guiding means comprising a plurality of helical elements carried by the spindle in respectively different angular relationships to the spindle axis and a like number of relatively stationary, cooperating elements mounted on the adjacent structure of the machine shiftable into and out of engagement each with one of said helical elements.

3. In a machine having an endwise reciprocable spindle rotatable about its axis, a sleeve having a plurality of helical elements, one of said elements being a right hand helix and the other a left hand helix, shoes mounted in the machine structure adjacent to said sleeve, each of said shoes being complemental to one of said helical elements and being movable into and out of engagement with the element to which it is complemental, and means for so moving said shoes.

4. In a machine, a supporting structure, a spindle mounted with provision for rotation about its axis and endwise reciprocation in said structure, a plurality of guide elements mounted on said structure with provision for movement toward and away from the axis of the spindle, means for so moving said guide elements, and helical guiding portions carried by the spindle of respectively different helix angles, one of said guiding portions being complemental to one of said guide elements and another helical guiding portion being complemental to another of said guide elements.

5. In a machine, a supporting structure, a spindle mounted in said supporting structure with capacity for reciprocating movement endwise and for rotation about its axis, a sleeve secured to said spindle having right and left hand helical elements in its circumference, and guide shoes mounted in the supporting structure each complemental to one of said helical elements and being shiftable into and out of engagement with the helical element to which it is complemental.

EDWARD W. MILLER.